United States Patent [19]

Haus et al.

[11] Patent Number: 4,505,587

[45] Date of Patent: Mar. 19, 1985

[54] PICOSECOND OPTICAL SAMPLING

[75] Inventors: Hermann A. Haus, Lexington, Mass.; Steven T. Kirsch, Sunnyvale, Calif.; Frederick J. Leonberger, Lexington, Mass.

[73] Assignee: Massachusetts Institute of Technology, Cambridge, Mass.

[21] Appl. No.: 425,130

[22] PCT Filed: Aug. 14, 1981

[86] PCT No.: PCT/US81/01086
§ 371 Date: Aug. 4, 1982
§ 102(e) Date: Aug. 4, 1982

[51] Int. Cl.³ .............................. G01B 9/02
[52] U.S. Cl. .................... 356/345; 350/96.14
[58] Field of Search ............. 356/345, 360, 361; 350/96.11, 96.14

[56] References Cited

U.S. PATENT DOCUMENTS 4,070,094 1/1978 Martin ..................... 350/96.14

OTHER PUBLICATIONS

Alferness, "Guided-Wave Devices for Optical Communication," *IEEE J. of Quant. Electronics*, vol. QE-17, No. 6, pp. 946-959, Jun. 1981.
Keil et al., "Mack-Zehucler Waveguide Modulations in Ti-Diffusal LiNbO₃", *Siemens Forsch u. Entwickl.* vol. 9, No. 1, pp. 26-31, Jan. 1980.
Haus et al., "Picosecond Optical Sampling," *IEEE J. of Quant. Electronics*, vol. QE-16, No. 8, pp. 870-873, Aug. 1980.

*Primary Examiner*—Davis L. Willis
*Assistant Examiner*—Matthew W. Koren
*Attorney, Agent, or Firm*—Arthur A. Smith, Jr.; Thomas J. Engellenner

[57] ABSTRACT

A high speed sampling technique is proposed using a cascade of optical waveguide interferometers driven by CW sinusoidal traveling or standing microwaves. Each interferometer multiplies the optical signal by a function closely approximated by $\cos^4 \omega t$, where $\omega$ is the frequency of its microwave drive. A cascade of four interferometers with 2.6 V microwave drives at 10, 20, 40, and 80 GHz and a total length of 2 cm can sample an optical signal with 2 ps resolution and 50 ps between samples.

6 Claims, 2 Drawing Figures

PICOSECOND OPTICAL SAMPLING

This application is based upon and claims the priority of International Application No. PCT/US81/01086, filed Aug. 14, 1981.

TECHNICAL FIELD

The field of this invention is optical signal processing and, more particularly, very short optical pulse generation.

BACKGROUND ART

In recent years there has been considerable progress in integrated optics technology. Optical devices such as modulators, switches and multiplexers have been successfully fabricated on single substrates of both dielectrics and semiconductors. These devices are rugged, compact and relatively easy to construct. They are also compatible with optical fibers, semiconductor lasers and photodiodes. One such optical device is the Mach-Zehnder interferometeric modulator. In that device, an optical signal in an input optical waveguide is divided into two branches of equal lengths. The signals from the two branches are then recombined in a single-mode output waveguide. By electro-optically varying the index of refraction of one or both of those branches, the relative phase of the light at the end of each branch can be varied. The interference of those two recombined signals results in an output intensity which is dependent on the index of refraction of the controlled branch.

Attention is called to an article entitled "Picosecond Optical Sampling" by the inventors and their colleagues in the IEEE Journal of Quantum Electronics, Vol. QE-16, pp. 870-874, August 1980 and the references cited therein.

There exists a need for a generator of ultra-short optical pulses of regular shape and duration which can produce jitter-free trains of such pulses.

DISCLOSURE OF THE INVENTION

This invention discloses an integrated optical system for generating ultra-short pulses by using sinusoidal microwave fields applied to optical waveguides. The technique exploits the availability of compact microwave oscillators up to 100 GHz and the broad bandwidth achievable in traveling-wave optical switches and modulators. By using a waveguide version of a Mach-Zehnder interferometer and sinusoidally modulating the phase matching via a microwave oscillator in a mode converter biased for 100 percent convertion, convertion will occur only for voltages sufficiently close to zero. To get short samples one must minimize the time the voltage spends near zero; hence, a cascade of microwave driven interferometers operating at a moderate voltage will achieve ultra-short (picosecond) samples.

To permit synchronization of the drive means and to obtain short samples with a long time and no spurious intensity peaks between samples, the following equation can be used:

$$\omega_k = 2^k \omega_o$$

where $\omega_o$ is the fundamental frequency of first interferometer drive means and k is a integer representing the order in the cascade.

DESCRIPTION OF THE PREFERRED EMBODIMENT

Figure 1:
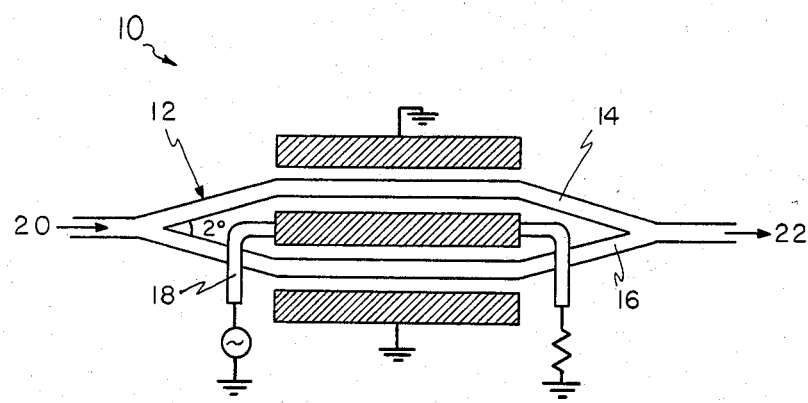
FIG. 1 is a schematic diagram of a waveguide interferometer and sinusoidal modulator.

In FIG. 1 a device 10 is shown including an interferometer 12 having an input 20, a first arm 14, a second arm 16 and an output 22. The device 10 also includes a microwave drive means 18. If the amplitude of the microwave drive is adjusted to produce a relative phase shift of $$\phi = \pi \sin \omega t$$

between the two arms 14, 16 of the interferometer 12, then complete transfer from input 20 to output 22 will occur at the zero crossings and no transfer will occur at the peaks (the power which is not transferred is converted to radiation modes rather than being reflected backwards). More precisely, neglecting the transit time of the optical signal, the drive 18 causes the interferometer 12 to have an optical transfer function of $$\frac{P_o(t)}{P_i(t)} = \cos^2\left(\frac{\pi}{2} \sin \omega t\right) \simeq \cos^4 \omega t$$

where $P_i$ and $P_o$ are the input and output power envelopes of the optical signal. Note that $P_o/P_i$ is a nonlinear function of the applied voltage so that the optical response is "narrower" than the applied modulation voltage.

Figure 2:
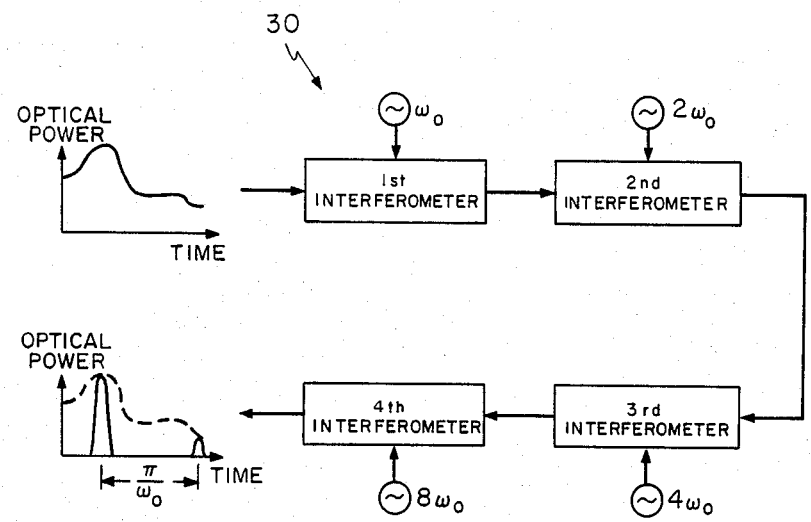
FIG. 2 is a schematic diagram of a cascade arrangement of devices like the one shown in FIG. 1.

In FIG. 2 a cascade 30 of devices such as the device 10, discussed above, is shown. For the general case of a cascade of N devices, the optical response is govern by the following equation:

$$\frac{P_o(t)}{P_i(t)} \simeq \prod_{k=o}^{N=1} \cos^4 \omega_k t.$$

For a given value of N, we would like short samples with a long time and no spurious intensity peaks between samples. We would also like the $\omega_k$'s to be harmonically related for synchronization purposes. Empirically, we find these constraints may be satisfied by choosing $$\omega_k = 2^k \omega_o$$

This establishes a time between samples of $\pi/\omega_o$ and provides shorter pulses than would be achieved by driving all sections at the same frequency without introducing any noticeable substructure between sampling pulses. For example, FIG. 2 shows that a cascade of four interferometers driven at 10, 20, 40, and 80 GHz produces samples 2 ps long spaced 50 ps apart. This pulse train is jitter-free in a relative sense: the pulses are centered on the zero crossings of the 10 GHz oscillator which may have an absolute stability of better than 1 part in $10^8$. Note that the other oscillators are perfectly phase locked to the master oscillator. Between samples, spurious peaks are over 30 dB down from unity. For more than three sections, adding an additional section will reduce the sample width by approximately a factor of two and hence increase the resolution (i.e., the time between pulses divided by the pulsewidth) by the same factor.

The interferometric coupler can be "tuned" for a complete transfer with a dc signal alone. No polarity reversal is required as in an alternating $\Delta\beta$ directional coupler. A cascade of four interferometers with a total electrode length of 2 cm would require about a 2.6 V drive on each device. The actual device must be slightly longer to accommodate the regions over which the waveguides split and recombine.

We were not required to choose an interferometer to implement our technique. If we had cascaded standard directional-coupler switches, we could have achieved short samples through a combination of cascading and increasing the drive voltage. Note that the interferometer is only useful when operated in a cascaded configuration because the optical response is a periodic function as in a directional-coupler switch.

Because the electrooptic coefficients of suitable optical waveguide materials are small, a distance of at least 3 mm is required for switching (a relative optical phase shift of at least $\pi$) at reasonable voltage (under 5 V) and with negligible loss due to the proximity of the electrodes. For a medium of refractive index of 2, it will require 20 ps for light to travel the length of the device. Suppose we want a sample that is 1 ps long. Then our microwave drive voltage can only remain sufficiently close to zero for less than 1 ps. Hence, our optical signal "sees" the proper voltage for less than 1/20 of the time. This transit time problem can be overcome by using a traveling microwave drive signal. If the phase velocity of the microwaves is adjusted to be equal to the group velocity of the optical signal, the device behaves as if its length were infinitesimal.

In practice, the inability to accurately match the velocities of the optical and microwave signals and the loss of the microwaves as they travel along the device would lead to decreased performance. For a directional coupler we expect that this would mean increased pulsewidth and decreased amplitude, although this is difficult to calculate. For the interferometer, however, the effects of velocity mismatching and loss can be easily calculated because the output depends on the net phase shift experienced by an infinitely narrow optical pulse as it travels down the waveguide at velocity $v_g$ (waveguide dispersion over a 5 mm distance can be neglected if the refractive index difference between film and substrate is less than $10^{-2}$). If the electric field across the waveguide of length L is f(z,t) then the voltage-length product of the equivalent device of infinitesimal width as a function of time is given by $$E(t_s) = \int_0^L f(z,t)\bigg|_{t = z/v_g + t_s} dz.$$

Using this equation, we find that by increasing the drive voltage from its minimum value for an ideal device, we can exactly compensate for almost any amount of velocity mismatch (there are discrete velocity mismatching points which require an infinite amount of voltage) and any amount of loss. For example, for an interferometer driven at or below 80 GHz, we can accommodate a velocity mismatch of over 20 percent by doubling the drive voltage. We can also accommodate a microwave power loss of 13.9 dB by doubling the drive voltage. Moreover, it should be noted that the window function can be sharpened by driving each device in a cascade by successively higher voltages.

Alternatively, we can create a standing-wave microwave voltage pattern by feeding the interferometer from the side with pads driven with alternation phase 180° apart. The distance between these pads can be adjusted so that the traveling-wave components of the microwave standing wave is identical to that of an infinitely short interferometer driven by a sinusoid. The benefits of the standing wave approach are neglibible microwave loss and automatic velocity matching. The drawback is that the electrode fabrication is more intricate and tunability is reduced.

INDUSTRIAL APPLICATIONS

Our pulse generation can be used as the sampling element in a real-time picosecond sampling oscilloscope and can also be used as a source of highly uniform picosecond pulses from a CW laser.

The device is operated at a fixed sampling rate which is set by the frequency of the lowest microwave oscillator. For a cascade of four interferometers, a pulsewidth of 4 percent of the sampling period can be obtained and spurious response peaks are down in excess of 30 dB. The sampler is tolerant of velocity mismatches between microwave and optical waves and losses in the microwave guide. Such variations can be exactly compensated by slightly increasing the amplitude of the voltage drive. We expect that drives less than 3 V will be required in practice for a cascade 2 cm long.

What we claim is:

1. An ultra-short optical pulse generator comprising:
   (a) a source of optical radiation;
   (b) a plurality of waveguide interferometers, each interferometer having an input to receive said radiation, at least two branches in which said optical radiation diverges, and an output in which the divergent radiation is recombined, the plurality of waveguide interferometers being connected to each other to define a first interferometer and a series of subsequent interferometers in cascade arrangement; and
   (c) a plurality of field means, each field means coupled to one of the interferometers to modulate the phase-matching conditions at its output, whereby upon modulation of the first interferometer at a particular frequency and further modulation of the subsequent interferometers at progressively higher harmonic frequencies, ultra-short pulses of radiation are produced when phase-matching occurs.

2. The pulse generator of claim 1 wherein the field means are microwave field means.

3. The pulse generator of claim 1 wherein four interferometers are connected in cascade, the first interferometer being driven by a field means at a frequency $\omega_o$, the second interferometer driven at a frequency $2\omega_o$, the third interferometer driven at a frequency $4\omega_o$ and the fourth driven at a frequency $8\omega_o$.

4. The pulse generator of claim 3 wherein $\omega_o$ is about 5 gigahertz.

5. The pulse generator of claim 1 wherein the field means are means for creating standing waves in said branches of said interferometers.

6. The pulse generator of claim 1 wherein the field means are means for creating traveling waves in said branches of said interferometers such that the phase velocity of the field means waves is about equal to the group velocity of the optical pulses.

* * * * *